May 1, 1951        J. B. SMITH        2,551,550

PIPE CONSTRUCTION

Filed Nov. 6, 1948

INVENTOR.
JOSEPH B. SMITH
BY
Oberlin & Limbach
ATTORNEYS

Patented May 1, 1951

2,551,550

UNITED STATES PATENT OFFICE 2,551,550

PIPE CONSTRUCTION

Joseph B. Smith, Cleveland, Ohio, assignor to The Standard Oil Company, Cleveland, Ohio, a corporation of Ohio Application November 6, 1948, Serial No. 58,725

3 Claims. (Cl. 285—93)

In marine installations, as tankers and barges, transporting oil and petroleum products, it is customary to employ very large diameter hose, eight inches and over, for making connection to the shore line or dock. Such hose, made of neoprene or other grease-resistant rubber substitute, is very heavy and lacking in desired flexibility. To manipulate such hose for making connections requires a crew of several men and usually a crane. In accordance with the present invention, however, a connection may be had which is much lighter and more easily handled, and provides desirable flexibility in the line. Other objects and advantages of the invention will appear from the following description.

To the accomplishment of the foregoing and related ends, the invention, then, comprises the features hereinafter fully described and particularly pointed out in the claims, the following description and the annexed drawing setting forth in detail certain illustrative embodiments of the invention, these being indicative, however, of but a few of the various ways in which the principle of the invention may be employed.

In general, the construction involves pipe sections with one end shaped as a spherical segment, and the other end being enlarged and carrying a packing ring, whereby an end of another section with the spherical segment contour may be received to coact with the packing ring and permit angular swinging movement, leak-tight.

Figure 1:
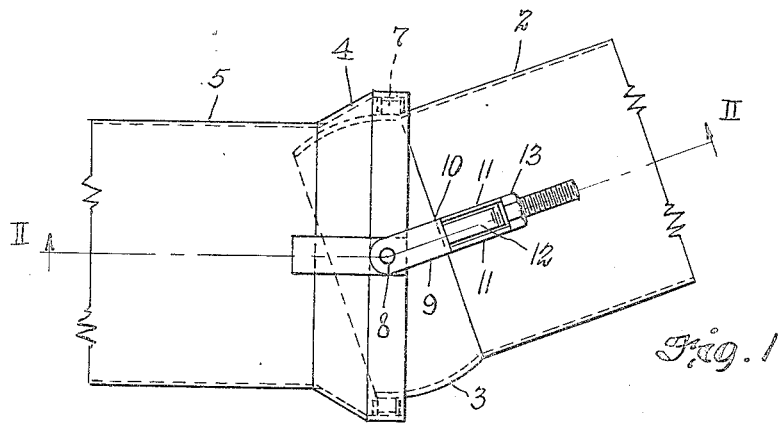
Fig. 1 is a side elevational view of a portion of a construction in accordance with the present invention.
Figure 2:
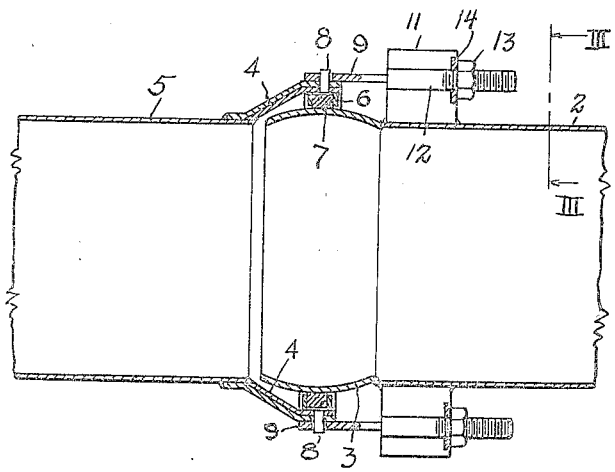
Fig. 2 is a section thereof taken substantially on line II—II of Fig. 1.
Figure 3:
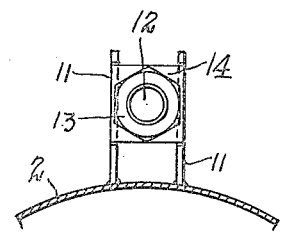
Fig. 3 is a fragmentary detail section, on larger scale, taken substantially on line III—III, Fig. 2.
Figure 4:
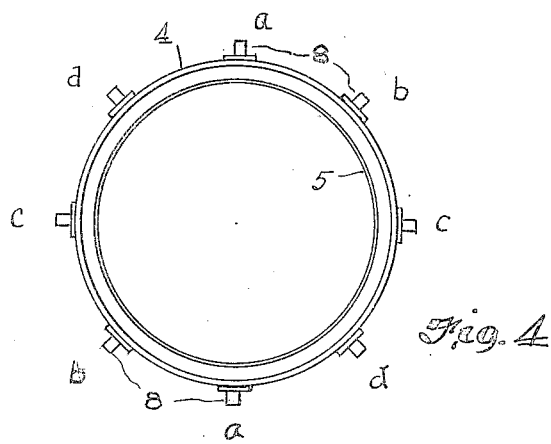
Fig. 4 is an end view of the pipe section shown at the left in Figs. 1 and 2.

As illustrated in Figs. 1 and 2, thus a pipe end 2 may have a spherical segment contour 3, and this is received in the enlarged or bell-end 4 of a pipe end 5. The bell end 4 is provided with a packing groove 6 which receives a packing ring 7 of grease-resistant synthetic rubber or like suitable substance to maintain a leak-tight joint against the spherical segment surface 3. To hold the two pipe ends together, while permitting angular movement therebetween, anchoring means at diametrically spaced points is provided. Conveniently, at such points on the bell-end 4 there may be pins 8, and in pivotal engagement therewith a corresponding pair of radius rods 9, which, as shown at Fig. 1, present a shoulder 10 which abuts against paired ears 11 carried by the pipe section 2. The radius rod 9 extends to the rear in the form of a bolt end 12, and nuts 13 serve to tighten up the bolts, thereby drawing the radius rods to bring shoulder 10 against ears 11 and the bell-end of the pipe 5 into position. Desirably, the ears 11 have a recess at the rear in which a rectangular washer 14 may seat under the bolt 13. As so far described, it is seen that a connection is provided which allows angular movement in one plane, viz. at right angles to the arrangement in Fig. 2. By having a plurality of the pivot pins 8 spaced around the periphery of the bell end 4, however, pairs of pins diametrally spaced may be connected to radius rods and pipe ends 2 to provide angular movement in additional planes. Thus, for instance, as in Fig. 4, where the bell end of the pipe section 5 has eight pivot pins spaced around its periphery, it is seen that a series of pipe sections may be connected up, the first joint, for instance, being with the radius rods engaging pins a—a, and the next joint having radius rods engaging pins b—b, the next joint engaging the pins c—c, and the next d—d, and thereby the series of pipe sections making up the line may be bendable at the respective joints such as to give a flexible line to the desired extent.

By making the pipe sections of relatively thin metal, and for instance desirably a light metal such as aluminum, notwithstanding a large diameter, the total weight may be kept within desirable limits. If the metal be slightly corrugated, the metal stock may be further thinned. In any case, a large diameter line is thus available, and the sections may be of a length as preferred in any given instance, a length of five or of ten feet being particularly convenient for use in dock-connection installation.

It will be noticed that the pipe end 3 assembles into the packing ring 7 primarily in a sort of wedging contact. The packing ring is desirably dimensioned about one-sixteenth inch smaller in diameter than the diameter of the spherical segment 3, and the packing ring is thus tightened against the segment 3 in the assembly. The radius rods or bolts draw the sections together, in making up the joint the end 3 being entered into the bell end 4 against the packing ring and the holes of the radius bolts being slipped over the diametrally positioned pins 8, and the bolts being positioned between the ears 11, the nuts 13 are tightened up, bringing the shoulders 10 of the radius rods or bolts against the ears 11 and fixing the relation of the coacting pipe ends such that the spherical segment 3 coacts with the packing ring 7 in the swing of the relative movement permitted. With the ends so assembled, pressure will not force the coupling apart. If fluid travels up the side of the packing ring exposed to the pressure, it merely enters the annular space between the outside of the packing ring and the groove, and the packing is forced the tighter against the surface of the segment 3.

To disassemble, the nuts 13 are backed off sufficiently to disengage the rectangular washers 14 from the recesses at the back of the ears 11, and the radius bolts can then be lifted clear of the pivot pins 8, and the pipe sections may then be separated. Irrespective of the movement of sections required to make up the desired connecting line, by reason of the spherical segment contour coacting with the packing rings, each joint remains tight regardless of angular movement, and the total angular movements permitted provide the desired flexibility for the line as a whole.

Other modes of applying the principle of the invention may be employed, change being made as regards the detail described, provided the features stated in any of the following claims, or the equivalent of such, be employed.

I therefore particularly point out and distinctly claim as my invention:

1. In a pipe having one end shaped in spherical-segment form and the other having an enlarged receiving end, means for joining pipe ends together consisting of diametrally spaced pivot pins projecting on the exterior of the periphery of said receiving end, and a pair of radius bolts each with a perforation at one end to slip onto a said pin and having a take-up nut on the other end, a rectangular washer for each nut, paired parallel ears on the exterior periphery of the spherical-segment end to receive such radius bolts, and means to hold said washers including rear recesses in said ears.

2. In a pipe having one end shaped in spherical-segment form and the other having an enlarged receiving end, means for joining pipe ends together consisting of diametrally spaced pivot pins projecting on the exterior of the periphery of said receiving end, and a pair of radius bolts each with a perforation at one end to slip onto a said pin and having a take-up nut on the other end, and paired parallel ears on the exterior periphery of the spherical-segment end to receive such radius bolts.

3. In pipe construction of coacting sections one having an end shaped in spherical section and the other having an enlarged receiving end therefor, means for connecting said sections for relative angular movement consisting of a plurality of pins projecting on one section with radius bolts connecting to the other and having take-up nuts, said connecting means providing optional engaging portions at spaced locations about the circumference whereby a plurality of connected sections permits movement in various directions.

JOSEPH B. SMITH.

REFERENCES CITED

The following references are of record in the file of this patent:

UNITED STATES PATENTS

| Number | Name | Date |
| --- | --- | --- |
| 922,075 | Bates | May 18, 1909 |

FOREIGN PATENTS

| Number | Country | Date |
| --- | --- | --- |
| 13,472 | Great Britain | June 9, 1909 |